United States Patent [19]
Ard

[11] Patent Number: 5,777,660
[45] Date of Patent: Jul. 7, 1998

[54] SCANNER ASSEMBLY

[75] Inventor: Mark Duan Ard, Santa Clara, Calif.

[73] Assignees: Ricoh Company, Ltd., Tokyo, Japan; Ricoh Corporation, San Jose, Calif.

[21] Appl. No.: 607,047

[22] Filed: Feb. 26, 1996

[51] Int. Cl.$^6$ ........................................ H04N 1/04
[52] U.S. Cl. .............................. 347/260; 355/25; 248/455
[58] Field of Search ............................ 347/260, 245, 347/263; 355/25, 75; 281/42, 45; 248/451, 454, 455, 460

[56] References Cited

U.S. PATENT DOCUMENTS

| | | | |
|---|---|---|---|
| 3,635,557 | 1/1972 | Alderton | 355/25 |
| 4,567,528 | 1/1986 | Wilman et al. | 355/25 |
| 4,585,334 | 4/1986 | Malyon | 355/25 |
| 4,633,080 | 12/1986 | Wilman et al. | |
| 4,976,408 | 12/1990 | Hertlein et al. | 248/454 |
| 5,359,207 | 10/1994 | Turner | |
| 5,475,505 | 12/1995 | Minasian et al. | |
| 5,493,943 | 2/1996 | Horikawa | 84/519 |
| 5,519,432 | 5/1996 | Genovese | 347/260 |
| 5,614,991 | 3/1997 | Moro et al. | 355/75 |

OTHER PUBLICATIONS

Brochure for Zeutschel's OmniScan 3000.
Brochure for Kodak's Imagelink Book Scanner 200.
Robert Sanchez, "Project Gutenberg", *Internet World*, Sep. 1995, pp. 58–60.

Brochure of the OmniScan 3000 by Zeutschel, 6 pages (no known date of publication).

Brochure of the Kodak Imagelink Book–Scanner 200, 5 pages (no known date of publication).

Internet World, Sep. 1995, pp. 58–60, "The Digital Press", Robert Sanchez.

IW, Saving great books, damage–free, Mar. 1, 1996, p. 71.

*Primary Examiner*—Stuart N. Hecker
*Attorney, Agent, or Firm*—Oblon, Spivak, McClelland, Maier & Neustadt, P.C.

[57] ABSTRACT

A V-shaped scanning head, a book support, and a scanner that includes the V-shaped scanning head and the book support. The V-shaped scanning head comprises a pair of scanning surfaces angled relative to each other to form a V-shaped scanning face. An image capturing means preferably in the form of a pair of angled photoelectric detector arrays or a pivotable scanning arrangement is provided for capturing images of both sides of a book, the images being received through the scanning face. Processing circuitry, typically provided in the scanning head, processes the signals received from the image capturing means. The book can be supported on a movable book support that is capable of adopting a V-shaped configuration to support the open book.

30 Claims, 5 Drawing Sheets

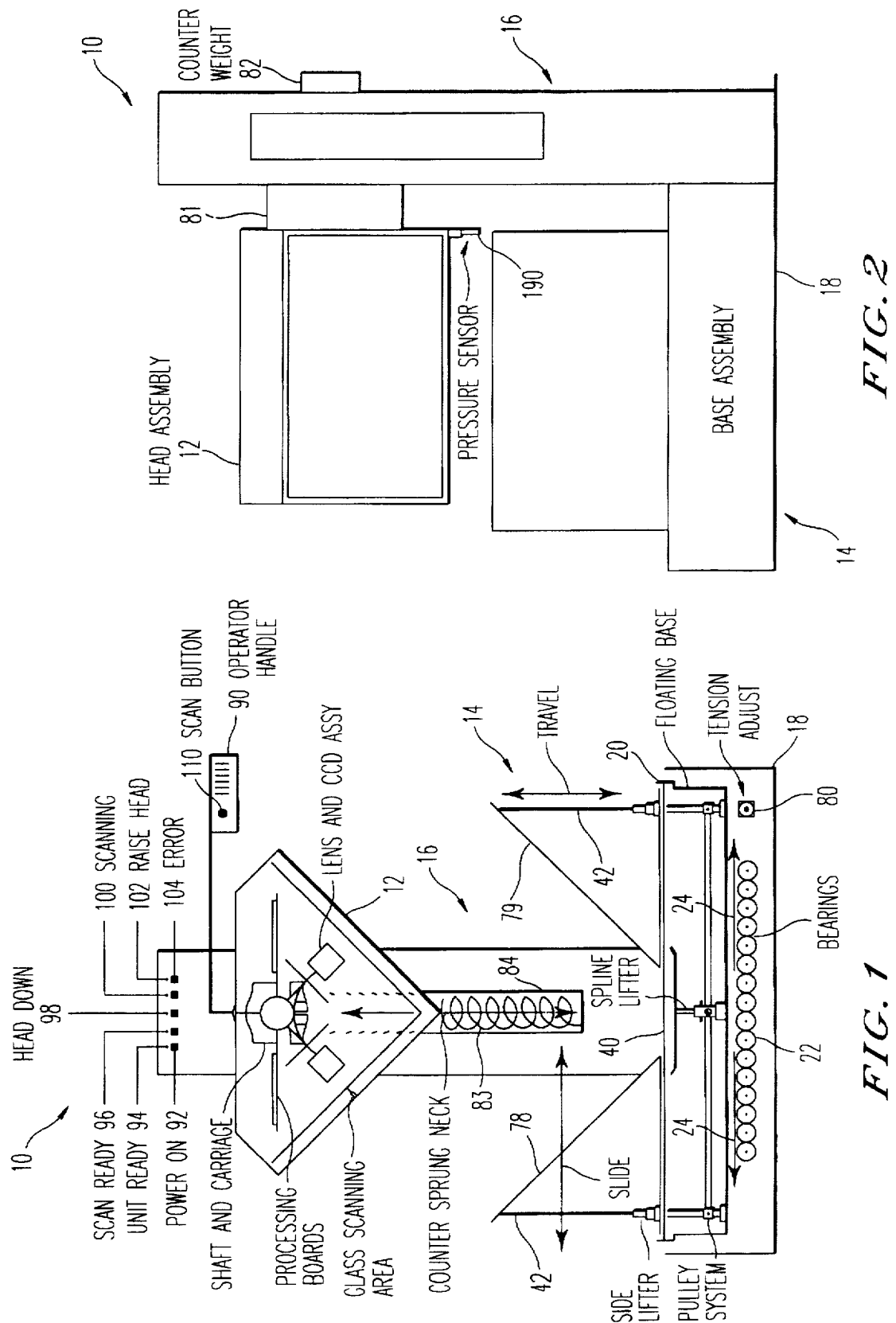

SCANNER ASSEMBLY

FIELD OF THE INVENTION

This invention relates to scanners.

BACKGROUND OF THE INVENTION

Photocopying machines or scanners are well known in the art. These typically involve the process of scanning separate pages and do not provide a facility for scanning pages bound in a book. Some devices have, however, been developed to accommodate bound books. These include edge scanners, where the glass edge of a flat bed scanner extends to one edge of the unit allowing a book to be placed on the edge, one page at a time. Another method involves overhead scanning, wherein the book is laid open, and both pages are scanned simultaneously by a camera. The problem associated with the latter is the distortion that results towards the center of the picture where the book is bound due to the curvature of the pages. A need therefore exists for addressing these problems.

OBJECTS AND SUMMARY OF THE INVENTION

It is an object of the invention to provide a book scanner that allows opposite pages of a book to be scanned simultaneously without causing distortion of the image.

It is a further object to provide a book scanner that will accommodate a book without exerting excessive stress on the spine of the book.

It is a further object of the invention to provide a book scanner that will accommodate a variety of book sizes.

According to the invention there is provided a V-shaped scanning head comprising a pair of scanning surfaces angled relative to each to form a V-shaped scanning face, and image capturing means for capturing an image received through the scanning face.

The image capturing means can include a pair of photoelectric detector arrays angled relative to each to lie substantially parallel to the pair of scanning surfaces. Each photoelectric detector array can comprise a row of charge coupled devices.

The image capturing means can further include a pair of light bulbs arranged in a V-shaped configuration, and a pair of lenses angled relative to each other to receive images through the pair of angled surfaces.

Further, according to the invention there is provided a scanner including a scanning head, wherein the scanning head comprises a pair of scanning surfaces angled relative to each other to form a V-shaped scanning face, and image capturing means for capturing at least one image received through the scanning face, the scanner further including processing circuitry for processing the signals received from the image capturing means.

The scanner can include a book support for supporting a book, which can include a spine supporting means for supporting the spine of a book, and a pair of side lifters arranged at opposed sides of the spine supporting means for lifting the sides of the book. The spine supporting means can be mounted to be vertically movable and can be connected to the side lifters to provide complementary raising motion of the side lifters for lifting the sides of the book. The spine supporting means can further include urging means for urging the spine supporting means upwardly thereby to cause the complementary downward movement of the side lifters.

The book support can be mounted on bearings for adjustment of the position of the book support relative to the position of the scanning head.

The scanner can include a neck for connecting the scanning head to the book support. The scanning head can be slidably connected to the neck for movement towards and away from the book support, and the neck can include an urging means for urging the scanning means away from the book support.

The scanner can further include a pressure sensor for detecting when a predetermined amount of pressure is exerted on the book support by the scanning head.

Still further, according to the invention there is provided a book support comprising a spine supporting means for supporting the spine of a book, and a pair of side lifters arranged at opposed sides of the spine supporting means for lifting the sides of the book, wherein the spine supporting means is mounted to be vertically movable and is connected to the side lifters to provide complementary raising motion of the side lifters for lifting the sides of the book.

Each of the side lifters can include a vertically movable shaft and a pivotally mounted flap supported by the shaft. The shafts can be connected to the spine supporting means by means of rack and pinion means.

BRIEF DESCRIPTION OF THE DRAWINGS

FIG. 1 is a front view of scanner in accordance with the invention;

FIG. 2 is a side view of the scanner illustrated in FIG. 1;

DETAILED DESCRIPTION OF THE PREFERRED EMBODIMENTS

Figure 3:
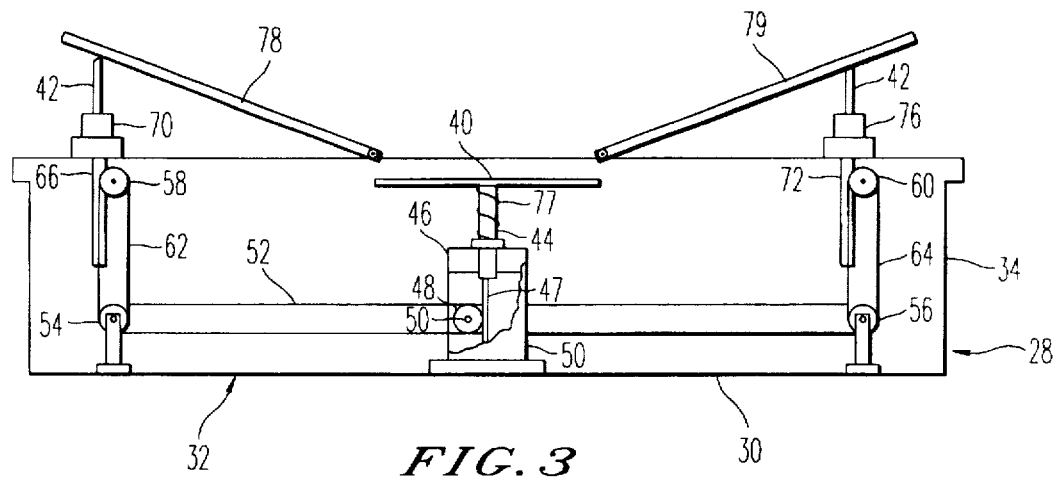
FIG. 3 is a partial cut-away side view of part of the base assembly of the scanner.

FIG. 1 shows a front view of a scanner 10 in accordance with the invention. The scanner 10 includes a head 12, a base assembly 14, and a neck 16 connecting the head 12 to the base assembly 14. A side view of the scanner is illustrated in FIG. 2.

The base assembly 14 includes a tray-like base 18 that supports a book support 20 on a set of bearings 22. The bearings 22 slidably support the book support 20 relative to the base 18 for one dimensional movement in the direction of the arrows 24.

Figure 4:
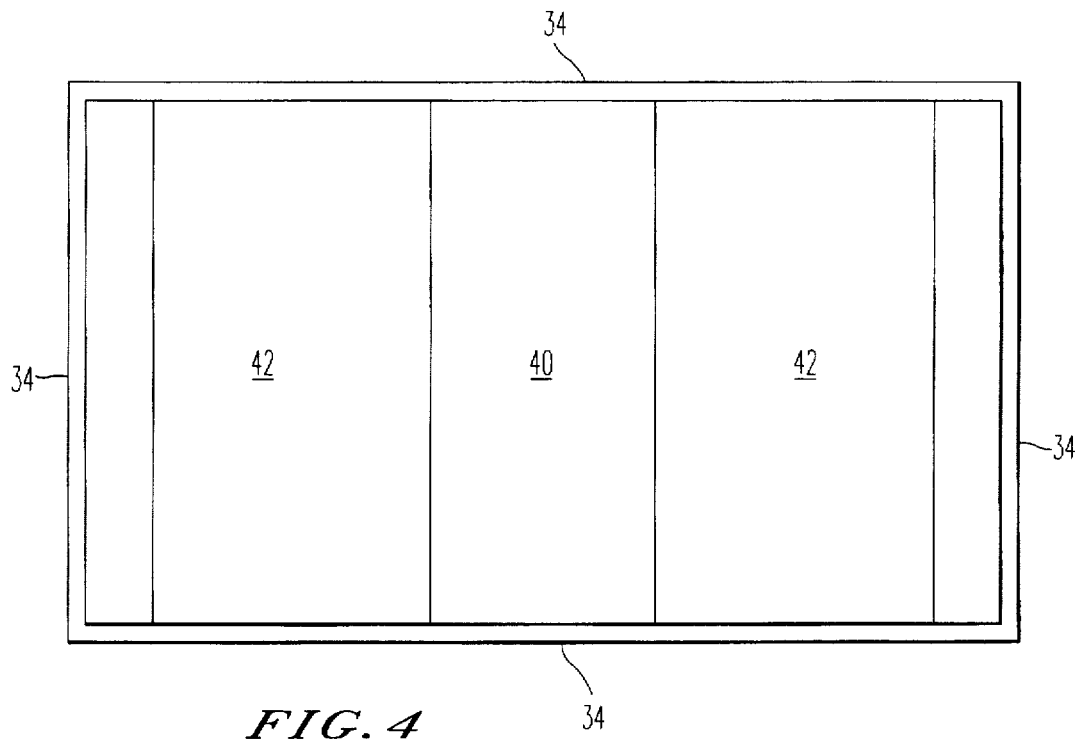
FIG. 4 is a plan view of the structure illustrated in FIG. 3.

The book support 20 is illustrated in greater detail in FIG. 3, and includes a housing 28, the lower surface 30 of which rides on the bearings 22 (FIG. 1). The housing 28 is illustrated in plan view in FIG. 4 and comprises a tray that includes a base 32 (FIG. 3) and side walls 34. A book support further comprises a spine support 40 to support the spine of a book, and two side lifters 42 for lifting the sides of the book, the spine support 40 and side lifters 42 being movably secured to the housing 28. The spine support or spine lifter 40 comprises a plate-like structure secured to a vertically extending shaft 44 that extends into a complementary sleeve-like housing 46. The shaft 44 is slidably received in the housing 46 and is secured to a rack 47 extending within the housing 46. The rack 47 engages a complementary pinion 48 rotatably mounted within the housing 46 to be rotatable about an axis defined by the pin 50. A toothed belt 52 engages the pinion in the housing 46 to define a pulley arrangement with the complementary pinons 54, 56. Thus, as the spine support 40 is moved downwardly, the rack 47 secured to the shaft 44 causes rotation of the pinion 48 in the housing 46, thereby rotating the pinions 54, 56. The pinions 54, 56 are, in turn, coupled to pinions 58, 60 by means of toothed belts 62, 64, respectively. The pinion 58 engages a complementary rack 66 that is secured to one of the side lifters. Rotation of the pinion 58 therefore causes vertical movement of the shaft 66, which is slidably supported by the housing 70. The pinion 60 similarly engages a rack 72 to cause vertical movement of the other side lifter relative to its supporting housing 76. A spring 77 is mounted between the housing 46 and the shaft 44 to urge the shaft 44 upwardly to cause the spine support 40 to be in its top-most position and the side lifters 42 to be at their lowest elevation as illustrated in FIG. 3. As force is exerted on the spine support 40 to push it downwardly against the force of the spring, complementary upward movement of the side lifters 42 results. As shown in FIG. 3, the side lifters 42 engage two pivotally mounted plates 78, 79 which provide flat supporting surfaces for the sides of a book. Further, a tension adjust 80 (FIG. 1) is provided that allows the force exerted by the spring 77 to be adjusted to accommodate different weights placed on the spine support 40.

The neck is now considered with reference to FIGS. 1 and 2. The neck 16 is connected to the rear end of the base assembly 14 as illustrated in FIG. 2. It extends vertically upwardly to support the head 12 above the base assembly 14, by means of a boom 81. The head 12 is secured to one end of the boom 81 and its weight is counteracted by means of a counterweight 82. The boom 81 engages a slot 84 in the neck 16 allowing it to ride up and down in the slot 84, the head 12, boom 81 and counterweight 82 being urged upwardly by means of a spring 83 mounted in the slot 82. To move the head 12 downwardly, an additional force therefore has to be exerted on the head 12. This is achieved by means of an operator handle 90 secured to the head 12 as illustrated in FIG. 1. The neck 16 also serves as a housing for indicators and interface connections. Indicator lights include a power on light 92, a unit ready light 94, a scan ready light 96, a head down light 98, a scanning light 100, a raise head light 102, and an error light 104.

Book scanning is performed by placing the book face up on the support provided by the spine support 40 and plates 78, 79. The weight of the book typically compresses the spring 77 only partially. The book therefore retains a fairly open condition as dictated by the angles of the two side plates 78, 79 relative to each other, and the relative position of the spine support 40. In order to scan a picture the head 12 is moved downwardly by means of the operator handle 90 so as to engage the book surface. As force is exerted on the book the spine support 40 is depressed, thereby lifting the side lifters 42 to bring the pages of the book into engagement with the head 12. Depression of a scan button 110, placed on the operator handle 90 for purposes of convenience, initiates the scanning operation. Upon completion of the scanning operation, the head 12 is lifted to allow the spine support 40 to be raised by the urging spring 77 and causing the book to fall open to allow the pages of the book to be turned for scanning of subsequent pages. It will be appreciated that the bearings 22 will automatically adjust the relative position of the book in relationship to the head 12 thereby insuring that both sides of the book snugly engage the V-shaped head 12 irrespective of the number of pages on either side of the vertex of the V. It will further be appreciated that the rack and pinion assembly described for the platform 20 is merely one way of implementing the book support structure. The spine support 40 and side lifters 42 could instead be movably mounted by means of hydraulic or pneumatic pistons or by means of electric motors. In yet another embodiment only one side lifter could be provided, with the spine support providing a support for both the spine and the other side of the book. Clearly in such an embodiment, the second side of the book would remain in a horizontal position. Thus, the scanning head would typically have to be arranged to be movable towards the vertex of the book from an angle rather than directly from above.

Figure 5:
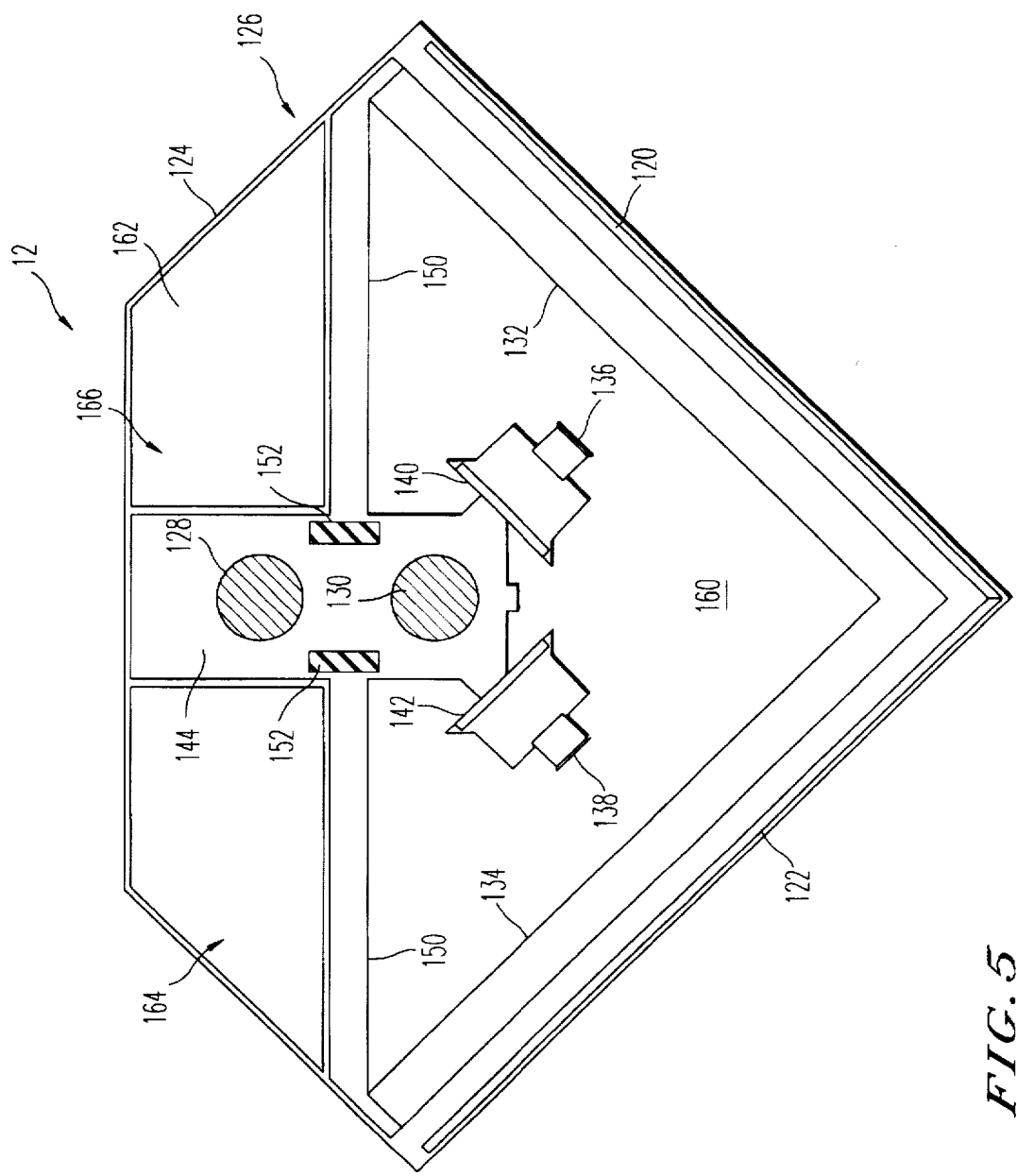
FIG. 5 is a front view of the scanning head of the scanner of the invention.
Figure 6:
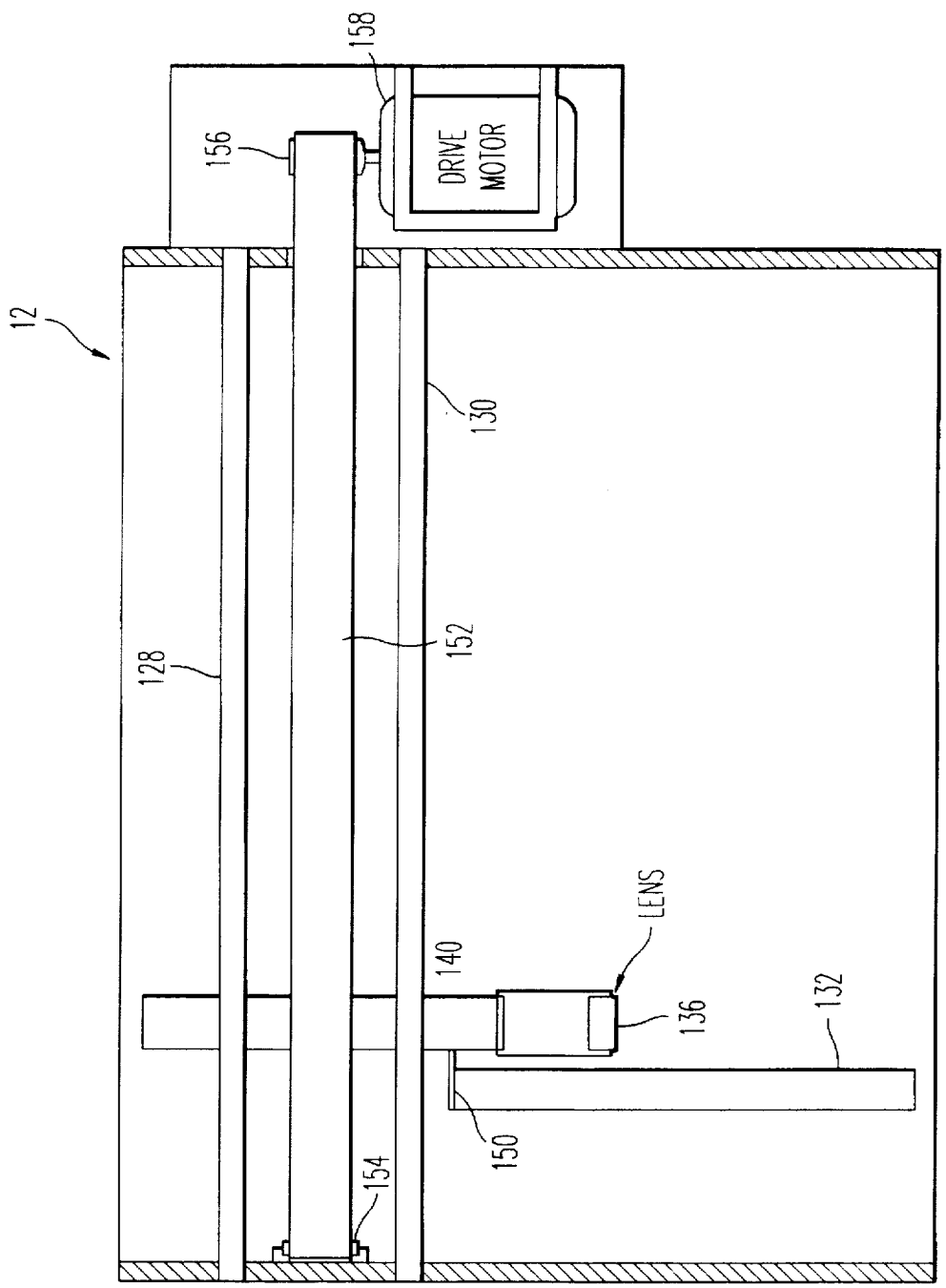
FIG. 6 is a side view of the scanning head of FIG. 5.

The head 12 will now be described in greater detail with respect to FIGS. 5 and 6. FIG. 5 illustrates a sectional side view of the head 12. It includes a V-shaped scanning face defined by two glass plates 120, 122. These form the lower scanning face of the head 12. The glass surfaces 120, 122 are secured to an upper structure 124 to define a housing 126. The scanning mechanism is movably supported within the housing 126 by means of a pair of shafts 128, 130. The scanning mechanism comprises a pair of bulbs 132, 134, a pair of lenses 136, 138, and a pair of charge coupled devices (CCD's) 140, 142. The lenses 136, 138 and CCD's 140, 142 are secured to a support bracket 144 that has two bores for slidably receiving the shafts 128, 130. The bulbs 132, 134 are secured to the bracket 144 by means of plates 150. Referring specifically to FIG. 6, the bracket 144 with the scanning elements 132, 134, 136, 138, 140, 142 is propelled along the shafts 128, 130 by means of a belt 152 secured to the bracket 144 and extending around a pulley 154 and a motor drive shaft 156. An electric drive motor 158 propels the belt to cause the bulbs, lenses and CCD's connected to the bracket 144 to be moved along the length of the head 12. By providing a separate scanning arrangement for each side, the two scanning arrangements being angled outwardly as illustrated in FIG. 5, simultaneous scanning of two pages of a book is achieved. Instead, a single horizontally mounted detector array could be provided, with mirrors or prisms directing the images from both sides of the book onto different portions of the array. In yet another embodiment, a single pivotable scanning arrangement could be provided to scan one side at a time. In such an arrangement the scanning arrangement or the entire head is pivoted between scans to accommodate the differently sloped page surfaces.

Figure 7:
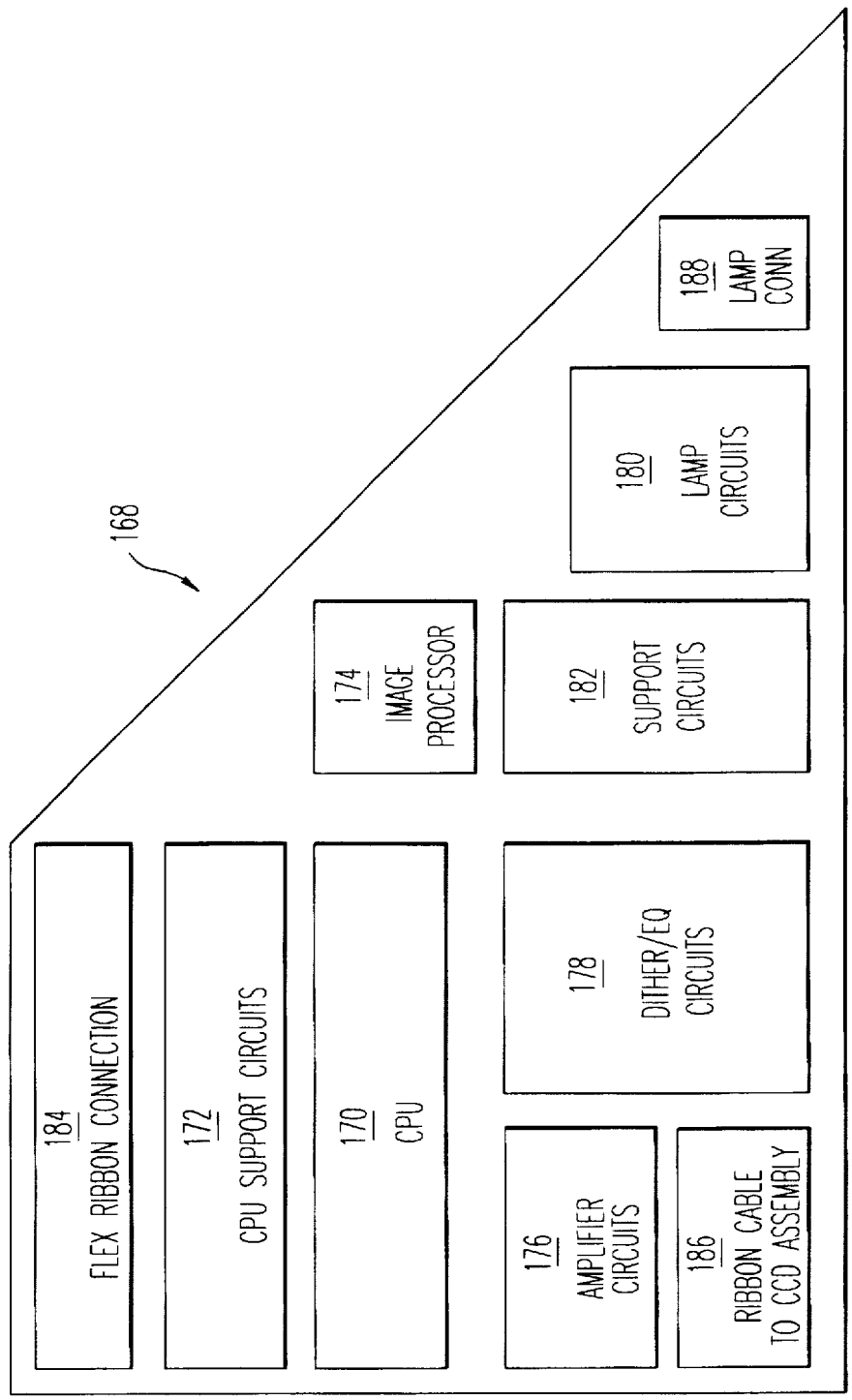
FIG. 7 is a schematic representation of one of a pair of head assembly video boards.

Referring specifically to the embodiment illustrated in FIGS. 5 and 6, the housing 126 comprises a scanning compartment 160 and a processing compartment 162. The processing compartment 162 comprises a first compartment 164 and a second compartment 166, each of which houses a video board 168 as illustrated in FIG. 7. Each board 168 includes a CPU 170 and CPU support circuitry 172, an image processor 174, amplify circuitry 176, dither circuitry 178, lamp circuitry 180 and other support circuitry 182. It also includes a flex ribbon connector 184, a ribbon cable connector 186 for connection to the CCD assembly, and a lamp connector 188. In the proposed embodiment the CCD assembly comprises a 7,500 pixel element without any mirrors. This provides an 8-bit gray scale output and accommodates a 600 dots per inch (dpi), 12 inch photograph. Standard processing circuitry is used and chosen to provide quick scanning of less than four second for an 11×17 inch page at 300 dpi binary. To achieve this two individual scanning assemblies are provided scanning both sides of the book simultaneously. One of the scanning mechanisms includes a buffer for storing the scanned information while the information from the other scanner is processed.

As mentioned above, operation of the scanner involves placing a book on the spine support 40 and plates 78, 79 and lowering the head 12 onto the book so as to lower the spine support 40 and raise the side lifters 42. A pressure sensor 190 (FIG. 2) determines when sufficient pressure is exerted on the book, and causes the scan ready light 96 to light up. This signals the operator that the system is ready to perform a scanning sequence which is initiated by pressing the scan button 110. During scanning the light 100 lights up, and upon completion of the scanning operation, scanning light 100 turns off and the raise head light 102 is illuminated. In the event of a fault, the error light 104 illuminates. As mentioned above, the neck 16 also supports a power on light 92, a unit ready light 94 and a head down light 98. The power on light merely indicates supply of power to the scanner 10. Once the scanner 10 has warmed up, the unit ready light 94 lights up. The head down light 98, in turn, is connected to a sensor that detects whether the head 12 is in its fully up position.

While the head 12 has been described with reference to a single row of CCD's for each side of the scan head, it will be appreciated that any other scanning mechanism can be used without departing from the nature and scope of the invention. Clearly also, an embodiment can be devised in which the book is placed upside down on a V-shaped screen to perform scanning of both pages of a book simultaneously from below. This avoids the need for a separate book support but has the disadvantage of making it more difficult to turn the pages of the book.

We claim:

1. A scanner, comprising:
   a scanning head including a pair of scanning surfaces angles relative to each other to form a V-shaped scanning face, and image capturing means for capturing at least one image received through the scanning face;
   processing circuitry for processing the signals received from the image capturing means;
   a block support; and
   a neck slidably connecting the scanning head to the book support for moving the scanning head towards and away from the book support.

2. A scanner of claim 1, wherein the neck includes an urging means for urging the scanner head away from the book support.

3. A scanner of claim 1, further including a pressure sensor for detecting when a predetermined amount of pressure is exerted on the book support by the scanning head.

4. A scanner of claim 1, wherein the book support is mounted on bearings for adjustment of the position of the book support relative to the position of the scanning head.

5. A scanner of claim 1, wherein the book support includes a spine supporting means for supporting the spine of a book, and a pair of side lifters arranged at opposed sides of the spine supporting means for lifting the sides of the book.

6. A scanner of claim 5, wherein the spine supporting means is mounted to be vertically movable and is connected to the side lifters to provide complementary raising motion of the side lifters for lifting the sides of the book.

7. A scanner of claim 6, wherein the spine supporting means includes urging means for urging the spine supporting means upwardly thereby to cause the complementary downward movement of the side lifters.

8. A scanner of claim 1, wherein the image capturing means includes a pair of photoelectric detector arrays angled relative to each other to lie substantially parallel to the pair of scanning surfaces.

9. A scanner of claim 8, wherein each photoelectric detector array comprises a row of charge coupled devices.

10. A scanner of claim 8, wherein the image capturing means further includes a pair of light bulbs arranged in a V-shaped configuration, and a pair of lenses angled relative to each other to receive images through the pair of angled surfaces.

11. A book support comprising a spine supporting means for supporting the spine of a book, and a pair of side lifters arranged at opposed sides of the spine supporting means for lifting the sides of the book, wherein the spine supporting means is mounted to be vertically movable and is connected to the side lifters to provide complementary raising motion of the side lifters for lifting the sides of the book.

12. A book support of claim 11, wherein each of the side lifters includes a vertically movable shaft and a pivotally mounted flap supported by the shaft.

13. A book support of claim 12, wherein the shafts are connected to the spine supporting means by means of rack and pinion means.

14. A scanner, comprising:
   a scanning head including a pair of scanning surfaces angled relative to each other to form a V-shaped scanning face, and image capturing means for capturing at least one image received through the scanning face;
   processing circuitry for processing the signals received from the image capturing means; and
   a book support including a spine support means for supporting the spine of a book, and a pair of side lifters arranged at opposed sides of the spine supporting means for lifting the sides of the book, wherein the spine supporting means is mounted to be vertically movable and is connected to the side lifters to provide complementary raising motion of the side lifters for lifting the sides of the book.

15. A scanner according to claim 14, wherein the spine supporting means includes urging means for urging the spine supporting means upwardly thereby to cause the complementary downward movement of the side lifters.

16. A scanner, comprising:
   a scanning head including a pair of scanning surfaces angled relative to each other to form a V-shaped scanning face, and an image capturing device configured to capture at least one image received through the scanning face;
   processing circuitry for processing the signals received from the image capturing device; and
   a book support including a spine support configured to support the spine of a book, and a pair of side lifters arranged at opposed sides of the spine support for lifting the sides of the book, wherein the spine support is mounted to be vertically movable and is connected to the side lifters to provide complementary raising motion of the side lifters for lifting the sides of the book.

17. A scanner according to claim 16, wherein the spine support includes a spring for urging the spine support upwardly thereby causing the complementary downward movement of the side lifters.

18. A book support comprising:
   a spine support for supporting a spine of a book; and
   a pair of side lifters arranged at opposed sides of the spine support in order to lift sides of the book,
   wherein the spine support is mounted to be vertically movable and is connected to the side lifters to provide complementary raising motion of the side lifters for lifting the sides of the book.

19. A book support according to claim 18, wherein each of the side lifters includes a vertically movable shaft and a pivotally mounted flap supported by the shaft.

20. A book support according to claim 19, wherein the shafts are connected to the spine support by a rack and pinion.

21. A scanner, comprising:
a scanning head including a pair of scanning surfaces angled relative to each other to form a V-shaped scanning face, and an image capturing device configured to capture at least one image received through the scanning face;
processing circuitry for processing signals received from the image capturing device;
a book support; and
a neck slidably connecting the scanning head to the book support for moving the scanning head towards and away from the book support.

22. A scanner according to claim 21, wherein the book support is mounted on bearings for adjustment of the position of the book support relative to the position of the scanning head.

23. A scanner according to claim 21, wherein the neck includes a spring for urging the scanner head away from the book support.

24. A scanner according to claim 21, further including a pressure sensor for detecting when a predetermined amount of pressure is exerted on the book support by the scanning head.

25. A scanner according to claim 21, wherein the book support includes a spine support configured to support the spine of a book, and a pair of side lifters arranged at opposed sides of the spine support in order to lift the sides of the book.

26. A scanner according to claim 25, wherein the spine support is mounted to be vertically movable and is connected to the side lifters to provide complementary raising motion of the side lifters for lifting the sides of the book.

27. A scanner according to claim 26, wherein the spine support includes a spring configured to urge the spine support upwardly to thereby cause the complementary downward movement of the side lifters.

28. A scanner according to claim 21, wherein the image capturing device includes a pair of photoelectric detector arrays angled relative to each other to lie substantially parallel to the pair of scanning surfaces.

29. A scanner according to claim 28, wherein each photoelectric detector array comprises a row of charge coupled devices.

30. A scanner according to claim 28, wherein the image capturing device further includes a pair of light bulbs arranged in a V-shaped configuration, and a pair of lenses angled relative to each other to receive images through the pair of angled surfaces.

* * * * *